(12) United States Patent
Zhang

(10) Patent No.: US 9,710,455 B2
(45) Date of Patent: Jul. 18, 2017

(54) FEATURE TEXT STRING-BASED SENSITIVE TEXT DETECTING METHOD AND APPARATUS

(71) Applicant: TENCENT TECHNOLOGY (SHENZHEN) COMPANY LIMITED, Shenzhen, Guangdong (CN)

(72) Inventor: Honglin Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/110,541

(22) PCT Filed: Feb. 11, 2015

(86) PCT No.: PCT/CN2015/072749
§ 371 (c)(1),
(2) Date: Jul. 8, 2016

(87) PCT Pub. No.: WO2015/127859
PCT Pub. Date: Sep. 3, 2015

(65) Prior Publication Data
US 2016/0350282 A1 Dec. 1, 2016

(30) Foreign Application Priority Data
Feb. 25, 2014 (CN) .......................... 2014 1 0064854

(51) Int. Cl.
*G10L 15/183* (2013.01)
*G06F 17/27* (2006.01)
(Continued)

(52) U.S. Cl.
CPC ...... *G06F 17/2775* (2013.01); *G06F 17/2247* (2013.01); *G06F 17/2765* (2013.01); *G06F 17/30616* (2013.01); *G06F 17/30705* (2013.01)

(58) Field of Classification Search
CPC ..................................................... G10L 15/183
(Continued)

(56) References Cited

U.S. PATENT DOCUMENTS 6,085,201 A 7/2000 Tso
2004/0064438 A1\* 4/2004 Kostoff ............ G06F 17/30705
(Continued)

FOREIGN PATENT DOCUMENTS

CN 1614607 A 5/2005
CN 101477544 A 7/2009
(Continued)

OTHER PUBLICATIONS

International Search Report for International Application No. PCT/CN2015/072749, mailed May 13, 2015, 2 pages.
(Continued)

*Primary Examiner* — Michael N Opsasnick
(74) *Attorney, Agent, or Firm* — Knobbe Martens Olson & Bear LLP

(57) ABSTRACT

A feature text string of a currently detected text is acquired, and the feature text string is detected according to a finite-state machine established in advance, so as to obtain frequency of occurrence of each keyword in the feature text string. A weight of the keyword category in the text is calculated for each keyword category of multiple keyword categories based on the frequency of occurrence of each keyword corresponding to the keyword category and a preset weight of each keyword. The text is determined to be
(Continued)

sensitive when the weight of at least one keyword category is greater than a preset threshold.

12 Claims, 4 Drawing Sheets

(51) Int. Cl.
  *G06F 17/22* (2006.01)
  *G06F 17/30* (2006.01)
(58) Field of Classification Search
  USPC ........................................................ 704/1–10
  See application file for complete search history.

(56) References Cited

U.S. PATENT DOCUMENTS

| | | | | |
|---|---|---|---|---|
| 2004/0243581 | A1* | 12/2004 | Weissman | G06F 17/30616 |
| 2005/0086224 | A1* | 4/2005 | Franciosa | G06F 17/30663 |
| 2005/0102251 | A1* | 5/2005 | Gillespie | G06F 17/30687 |
| 2007/0061332 | A1* | 3/2007 | Ramer | G06Q 30/0241 |
| 2007/0185868 | A1* | 8/2007 | Roth | G06F 17/30911 |
| 2011/0055192 | A1* | 3/2011 | Tang | G06F 17/30684 |
| | | | | 707/706 |
| 2011/0161071 | A1* | 6/2011 | Duong-van | G06F 17/2785 |
| | | | | 704/9 |
| 2011/0307496 | A1* | 12/2011 | Jones | G06F 17/30386 |
| | | | | 707/748 |

FOREIGN PATENT DOCUMENTS

| | | |
|---|---|---|
| CN | 101976253 A | 2/2011 |
| CN | 102033964 A | 4/2011 |

OTHER PUBLICATIONS

Written Opinion of the International Searching Authority for International Application No. PCT/CN2015/072749, mailed May 13, 2015, 3 pages.

Aho, A. and Corasick, M. "Efficient String Matching: An Aid to Bibliographic search" Communications of the ACM, Jun. 1975, vol. 18, No. 6 pp. 333-340.

Boyer R. and Moore, J. "A Fast String Searching Algorithm" Communications of the ACM, Oct. 1977, vol. 20, No. 10 pp. 762-772.

* cited by examiner

US 9,710,455 B2

FEATURE TEXT STRING-BASED SENSITIVE TEXT DETECTING METHOD AND APPARATUS

FIELD OF THE TECHNOLOGY

The present disclosure relates to the field of information processing technologies, and in particular, to a sensitive text detecting method and apparatus.

BACKGROUND OF THE DISCLOSURE

As the Internet grows, network literature develops quickly due to its features such as being easy to read and covering massive data. However, the rapid popularization of the network literature and fast growing of content thereof are accompanied with many sensitive texts such as pornography, violence, and political views that are harmful to the physical and mental health of teenagers. The sensitive texts cause difficulty for readers. Therefore, how to detect a sensitive text and isolate the detected sensitive text in time has become a critical issue in creating a good reading environment for readers.

In the existing technology, a keyword list is configured in advance. The keyword list includes multiple keywords. When a new text is detected, a keyword is selected from the keyword list first, and then the text is scanned throughout and statistics about frequency of occurrence of the keyword in the text are collected. The foregoing operations are repeated until all keywords in the keyword list are traversed, so as to obtain frequency of occurrence, in the text, of each keyword in the keyword list. Lastly, it is detected whether the text is a sensitive text according to the frequency of occurrence, in the text, of each keyword in the keyword list. If the frequency of occurrence of at least one keyword in the text is greater than a preset threshold, the text is determined as a sensitive text.

In a process of implementing the present disclosure, the inventor finds that the existing technology at least has the following problem:

When a text is detected according to a keyword in a keyword list, the text needs to be scanned throughout many times according to each keyword, which costs much time and causes low efficiency in detecting the text.

SUMMARY

According to one aspect, a sensitive text detecting method is provided. The method includes:

acquiring a feature text string of a currently detected text;

detecting the feature text string according to a finite-state machine established in advance, so as to obtain frequency of occurrence of each keyword in the feature text string, the finite-state machine including multiple keywords;

calculating, for each keyword category of multiple keyword categories, a weight of the keyword category in the text based on the frequency of occurrence of each keyword corresponding to the keyword category and a preset weight of each keyword; and determining that the text is a sensitive text when the weight of at least one keyword category is greater than a preset threshold.

According to another aspect, a sensitive text detecting apparatus is provided. The apparatus includes:

a string acquiring module, configured to acquire a feature text string of a currently detected text;

a keyword detecting module, configured to detect the feature text string according to a finite-state machine established in advance, so as to obtain frequency of occurrence of each keyword in the feature text string, the finite-state machine including multiple keywords;

a weight calculating module, configured to calculate, for each keyword category of multiple keyword categories, a weight of the keyword category in the text based on the frequency of occurrence of each keyword corresponding to the keyword category and a preset weight of each keyword; and a sensitive text determining module, configured to determine that the text is a sensitive text when the weight of at least one keyword category is greater than a preset threshold.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

Embodiment 1

Figure 1:
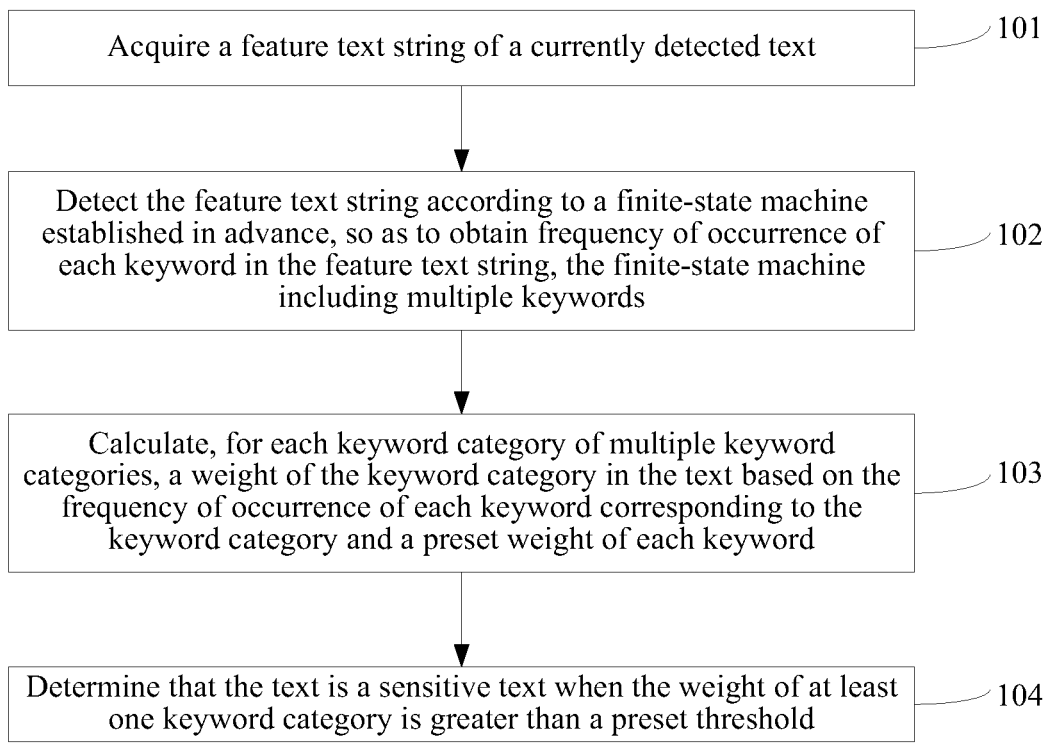
FIG. 1 is a flowchart of a sensitive text detecting method according to Embodiment 1 of the present invention.

This embodiment of the present invention provides a sensitive text detecting method. Referring to FIG. 1, a process of the method provided by this embodiment includes:

101: Acquire a feature text string of a currently detected text.

102: Detect the feature text string according to a finite-state machine established in advance, so as to obtain frequency of occurrence of each keyword in the feature text string, the finite-state machine including multiple keywords.

103: Calculate, for each keyword category of multiple keyword categories, a weight of the keyword category in the text based on the frequency of occurrence of each keyword corresponding to the keyword category and a preset weight of each keyword.

104: Determine that the text is a sensitive text when the weight of at least one keyword category is greater than a preset threshold.

According to the method provided by this embodiment, after a feature text string of a currently detected text is acquired, the feature text string is detected according to a finite-state machine established in advance, so as to obtain frequency of occurrence of each keyword in the feature text string; the feature text string is detected based on the finite-state machine established in advance, and therefore, in the detecting process, only the feature text string needs to be scanned throughout once, thereby improving detection efficiency, increasing a detection speed, and reducing a resource occupancy rate. Moreover, for each keyword category of multiple keyword categories, a weight of the keyword category in the text is calculated based on the frequency of occurrence of each keyword corresponding to the keyword category and a preset weight of each keyword, and it is determined, according to the weight of the keyword category, whether the currently detected text is a sensitive text. Because the preset weight of each keyword also needs to be used as a basis for determining a sensitive text, detection granularity and detection precision are improved, and a network reading environment can be purified.

Further, before the detecting the feature text string according to a finite-state machine established in advance, the method further includes:

configuring a keyword list, the keyword list at least including multiple keywords, a keyword category of each keyword, and a preset weight of each keyword;

determining a common prefix of all keywords in the keyword list; and establishing a tree-like finite-state machine by using the common prefix as a root node, each branch of the tree-like finite-state machine at least including one keyword.

Further, the detecting the feature text string according to a finite-state machine established in advance includes:

detecting the feature text string backward from the end of the feature text string based on the finite-state machine and by using a bad character shift technology.

Further, the detecting the feature text string backward based on the finite-state machine and by using a bad character shift technology includes:

Step a: Determine a shortest string in the finite-state machine, and move the finite-state machine backward from the end of the feature text string until an end character of the shortest string is aligned with an end character of the feature text string.

Step b: Determine whether an initial character of a common prefix matches a first character of the feature text string aligned with the common prefix.

Step c: Determine, based on the finite-state machine and starting from a character aligned with the initial character of the common prefix, whether a keyword exists in the feature text string if the initial character of the common prefix matches the first character of the feature text string aligned with the common prefix; and increase the frequency of occurrence of the keyword by 1 and move the finite-state machine backward by a length corresponding to a longest string if the keyword exists.

Step d: Determine whether a character matching the first character exists in the finite-state machine if the initial character of the common prefix does not match the first character of the feature text string aligned with the common prefix; move the finite-state machine backward if the character matching the first character exists, until the character matching the first character in the finite-state machine is aligned with the first character, and determine, based on the finite-state machine and starting from a character aligned with the initial character of the common prefix, whether a keyword exists in the feature text string; and increase the frequency of occurrence of the keyword by 1 and move the finite-state machine backward by a length corresponding to a longest string if the keyword exists.

Step e: Execute step b to step d repeatedly, until the common prefix reaches the beginning of the feature text string.

Further, before the calculating a weight of the keyword category in the text, the method further includes:

determining a position weight of each keyword, which corresponds to the keyword category, in the text; where the calculating a weight of the keyword category in the text includes:

calculating the weight of the keyword category in the text based on the frequency of occurrence of each keyword corresponding to the keyword category, the preset weight of each keyword, and the position weight of each keyword.

Further, after the determining that the text is a sensitive text, the method further includes:

determining, when the weight of at least one keyword category is greater than the preset threshold, a category of the text according to a keyword category that has a greatest weight;

determining a sensitive degree of the text by comparing the weight of the keyword category that has the greatest weight with the preset threshold; and outputting the sensitive degree of the text.

All the foregoing optional technical solutions can be combined randomly to form an alternative embodiment of the present invention, which is not further described herein.

Embodiment 2

Figure 2:
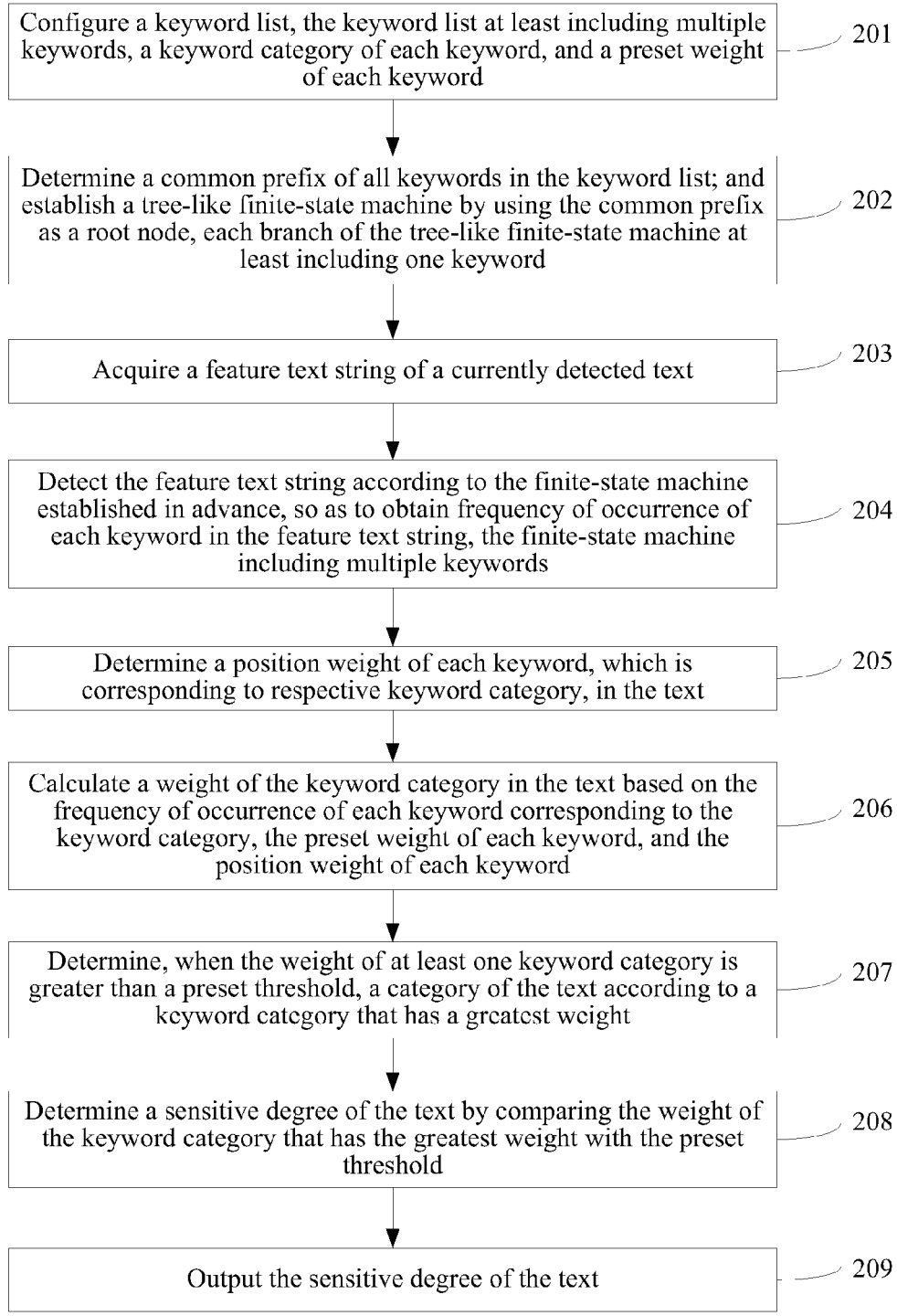
FIG. 2 is a flowchart of a sensitive text detecting method according to Embodiment 2 of the present invention.

This embodiment of the present invention provides a sensitive text detecting method. The following describes a sensitive text detecting manner provided by this embodiment of the present invention in detail with reference to content of Embodiment 1. Referring to FIG. 2, a process of the method provided by this embodiment includes:

201: Configure a keyword list, the keyword list at least including multiple keywords, a keyword category of each keyword, and a preset weight of each keyword.

In this embodiment, the keyword list may be configured in advance by a manager of a background server or a programmer. The keyword list includes multiple keyword categories, and each keyword category has one or more keywords. For example, the keyword categories include a politics category, a violence category, a pornography category, and the like. For example, the violence category may include multiple keywords such as fight, brawl, and group scuffle. The keyword category and the number of the keywords in each keyword category are not specifically limited in this embodiment.

In addition, besides corresponding to a keyword category, each keyword in the keyword list further corresponds to a preset weight, and a value of the preset weight may reflect a sensitive degree of the keyword. Assuming that the preset weight is a decimal number between 0 and 1, when the preset weight of a keyword is a value greater than 0.5, it indicates that the sensitive degree of the keyword is relatively high; and when the preset weight of a keyword is a value less than 0.5, it indicates that the sensitive degree of the keyword is relatively low. By setting the preset weight of the keyword, it may be precisely detected whether the currently detected text is a sensitive text in a subsequent process.

202: Determine a common prefix of all keywords in the keyword list; and establish a tree-like finite-state machine by using the common prefix as a root node, each branch of the tree-like finite-state machine at least including one keyword.

Figure 3:
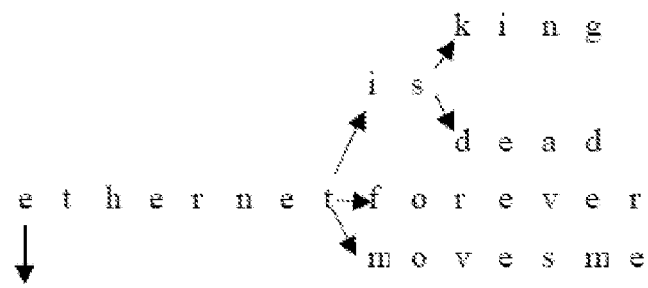
FIG. 3 is a schematic structural diagram of a finite-state machine according to Embodiment 2 of the present invention.

The common prefix refers to a same character part that each keyword has. For example, a common prefix of strings in, inn, and int is "in"; and a common prefix of strings ethernetmovesme, ethernetisking, ethernetisdead, and ethernetforever is "ethernet". The finite-state machine is a mathematical model for representing a finite number of states and behaviors such as transition and action between the states. When the tree-like finite-state machine is established, for example, if ethernetmovesme, ethernetisking, ethernetisdead, and ethernetforeve are keywords, the common prefix "ethernet" is used as a root node first, and then, starting from the root node, branches are established based on characters of the keywords. Moreover, from the root node to a bottom of a branch, at least one keyword is included. The established tree-like finite-state machine is shown in FIG. 3. In FIG. 3, four keywords each occupy one branch.

In addition, if the keywords in the keyword list do not have a uniform common prefix, a uniform common prefix may be set for each keyword, so as to establish a tree-like finite-state machine.

It should be noted that, when the method provided by this embodiment is executed, it is unnecessary to execute the foregoing steps 201 and 202 each time, and steps 201 and 202 only need to be executed when a sensitive text is initially detected. Furthermore, after the keyword list is configured and the finite-state machine based on the common prefix is established, when the background server detects a new text, the new text may be detected by using the following steps 203 to 210 to determine whether the text is a sensitive text.

203: Acquire a feature text string of a currently detected text.

The currently detected text is generally a latest text detected, in other words, a text newly uploaded by a network user terminal. When a new text is detected, a text detecting request including an identifier of the text may be generated as triggered, and the text detecting request is sent to a sensitive text detecting apparatus, so that the sensitive text detecting apparatus may load content of the text into a memory from a storage device according to the text detecting request, so as to perform sensitive text detection on the text.

Optionally, new text detection may be performed periodically, that is, it is detected at intervals of a preset period of time whether the network user terminal uploads a new text. After the new text is detected, a text detecting request is generated as triggered, and the text detecting request is also generated periodically. Besides, new text detection may also be performed in real time, that is, it is monitored in real time whether the network user terminal uploads a new text. After the new text is detected, a text detecting request is generated immediately as triggered. When the method provided by this embodiment is executed, the detection manner used is not specifically limited in this embodiment.

When the feature text string of the currently detected text is acquired, characters of the body and characters of the title of the currently detected text may be combined, so as to obtain a feature text string including the body and the title of the currently detected text.

204: Detect the feature text string according to the finite-state machine established in advance, so as to obtain frequency of occurrence of each keyword in the feature text string, the finite-state machine including multiple keywords.

In this embodiment, the detecting the feature text string according to the finite-state machine established in advance includes:

detecting the feature text string backward from the end of the feature text string based on the finite-state machine and by using a bad character shift technology.

Optionally, the detecting the feature text string backward based on the finite-state machine and by using a bad character shift technology specifically includes the following steps:

Step a: Determine a shortest string in the finite-state machine, and move the finite-state machine backward from the end of the feature text string until an end character of the shortest string is aligned with an end character of the feature text string.

The shortest string refers to a keyword having a smallest number of characters. The end of the feature text string refers to a position where the end character of the feature text string is located.

Step b: Determine whether an initial character of a common prefix matches a first character of the feature text string aligned with the common prefix.

To determine whether the initial character of the common prefix matches the first character is to determine whether the initial character of the common prefix is same as the first character; if the initial character of the common prefix is same as the first character, the initial character matches the first character; and if the initial character of the common prefix is not same as the first character, the initial character does not match the first character.

Step c: Determine, based on the finite-state machine and starting from a character aligned with the initial character of the common prefix, whether a keyword exists in the feature text string if the initial character of the common prefix matches the first character of the feature text string aligned with the common prefix; and increase the frequency of occurrence of the keyword by 1 and move the finite-state machine backward by a length corresponding to a longest string if the keyword exists.

Besides, the finite-state machine is directly moved backward by the length corresponding to the longest string if no keyword exists, where the longest string refers to a keyword having a largest number of characters.

Step d: Determine whether a character matching the first character exists in the finite-state machine if the initial character of the common prefix does not match the first character of the feature text string aligned with the common prefix; move the finite-state machine backward if the character matching the first character exists, until the character matching the first character in the finite-state machine is aligned with the first character, and determine, based on the finite-state machine and starting from a character aligned with the initial character of the common prefix, whether a keyword exists in the feature text string; and increase the frequency of occurrence of the keyword by 1 and move the finite-state machine backward by a length corresponding to a longest string if the keyword exists.

Besides, the finite-state machine is directly moved backward by the length corresponding to the longest string if the character matching the first character does not exist. The finite-state machine is also directly moved backward by the length corresponding to the longest string if no keyword exists.

Step e: Execute step b to step d repeatedly, until the common prefix reaches the beginning of the feature text string.

The following describes a process of detecting the feature text string backward based on the finite-state machine and by using a bad character shift technology in detail by using a specific example.

Figure 4:
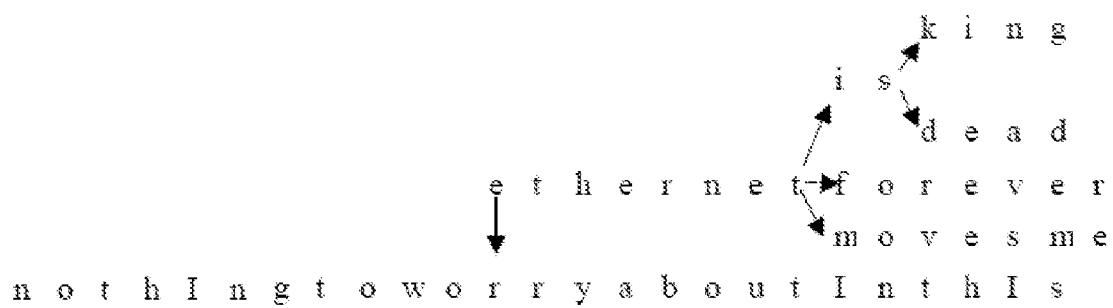
FIG. 4 is a schematic diagram of detecting a feature text string before characters are matched according to Embodiment 2 of the present invention.
Figure 5:
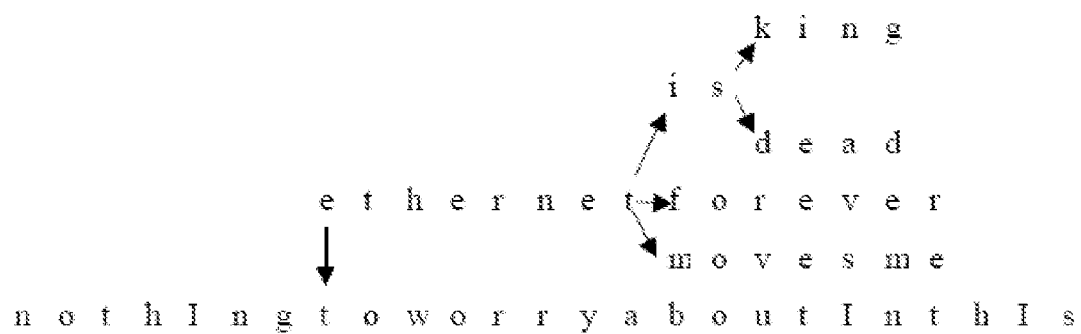
FIG. 5 is a schematic diagram of detecting a feature text string after characters are matched according to Embodiment 2 of the present invention.

As shown in FIG. 4, a bottom line of a currently detected text is "nothingtowor-ryaboutinthis" and the above is a tree-like finite-state machine. In this finite-state machine, the shortest string is a string corresponding to the keyword "ethernetisdead". The length of the keyword "ethernetisdead" is 14 characters. Therefore, in the first matching, the finite-state machine is moved backward from the end character "s" of the feature text string until the end character "d" of the shortest string "ethernetisdead" is aligned with the end character "s" of the feature text string. At this time, the initial character "e" of the common prefix is aligned with the first "r" in "worry" in the feature text string. Because the initial character "e" of the common prefix does not match the first "r" in "worry" in the feature text string, the first matching fails and the finite-state machine needs to be moved backward. Because the fifth character of the common prefix in the finite-state machine is the same as the first "r" in "worry" in the feature text string, the finite-state machine is moved backward until the fifth character "r" in the finite-state machine is aligned with the first "r" in "worry" in the feature text string. Refer to FIG. 5 for details. In FIG. 5, from the character "t" aligned with the initial character "e" of the common prefix, it is determined, based on the finite-state machine, whether a keyword exists in the feature text string. Starting from the character "t" aligned with the initial character "e" of the common prefix, no keyword exists in the feature text string, and therefore, the finite-state machine is continued to be moved backward. In this case, displacement of the movement is the length corresponding to the longest string "ethernetforever"; in other words, the finite-state machine is moved backward by 15 characters. After being moved backward by 15 characters, the finite-state machine reaches the beginning of the feature text string. Therefore, detection of the feature text string is completed. It should be noted that, by using the foregoing steps 203 to 204, detection of the feature text string may be completed and the frequency of occurrence of each keyword in the feature text string may be obtained. Further, in order to obtain a more precise detection result of a sensitive text, the method provided by this embodiment further includes the following step 205.

205: Determine a position weight of each keyword, which corresponds to respective keyword category, in the text.

To determine a position weight of each keyword, which corresponds to a keyword category, in the text, an occurrence position of each keyword, which corresponds to the keyword category, in the text needs to be determined first. The occurrence position of each keyword in the text may be determined when the feature text string is detected in the foregoing step 204. After the occurrence position of each keyword in the text is determined, the position weight of each keyword, which corresponds to respective keyword category, in the text may be determined according to preset position weights that correspond to different positions. When the position weights are set, position weights corresponding to the beginning and the end of the text may be set to greater values and a position weight corresponding to the middle of the text may be set to a smaller value. For example, position weights corresponding to the first one third of the text and the last one third of the text are set to 0.8 and a position weight corresponding to the middle one third of the text is set to 0.2. A manner of setting the position weights is not specifically limited in this embodiment. Further, the position weights corresponding to the beginning and the end of the text are set to greater values and the position weight corresponding to the middle of the text is set to a smaller value because the beginning and the end of the text usually include conclusive content and the conclusive content usually can reflect the main idea of the text. Besides, if a keyword occurs both in the beginning or end of the text and in the middle of the text, the frequency of occurrence of the keyword in the beginning or end of the text is further compared with the frequency of occurrence of the keyword in the middle of the text, and a part where the keyword occurs more frequently is the occurrence position of the keyword. In addition, if a keyword does not occur in the text, the position weight corresponding to the keyword is 0.

206: Calculate a weight of the keyword category in the text based on the frequency of occurrence of each keyword corresponding to the keyword category, the preset weight of each keyword, and the position weight of each keyword.

When the weight of the keyword category in the text is calculated, for each keyword of multiple keywords corresponding to the keyword category, the frequency of occurrence of each keyword may be multiplied by the preset weight and the position weight thereof, to obtain the weight of each keyword; and then the weight of each keyword is added together, to obtain the weight of the keyword category in the text.

Besides, the weight of the keyword category in the text may also be calculated only according to the frequency of occurrence of each keyword corresponding to the keyword category and the preset weight of each keyword. The specific manner for calculating the weight of the keyword category in the text is not specifically limited in this embodiment. In this embodiment, calculating the weight of the keyword category in the text based on the frequency of occurrence of each keyword corresponding to the keyword category, the preset weight of each keyword, and the position weight of each keyword is used as an example for description.

The following describes in detail a process of calculating a weight of a keyword category in a text by using a specific example.

For example, the keyword category is category S; the keywords corresponding to the keyword category are keyword A, keyword B, and keyword C; the frequency of occurrence, the preset weight, and the position weight of keyword A are a1, b1, and c1, respectively; the frequency of occurrence, the preset weight, and the position weight of keyword B are a2, b2, and c2, respectively; and the frequency of occurrence, the preset weight, and the position weight of keyword C are 0, b3, and 0, respectively. Weights of keyword A, keyword B, and keyword C are separately calculated first. Weight of keyword A=a1*b1*c1, weight of keyword B=a2*b2*c2, and weight of keyword C=0*b1*0=0. Therefore, weight of category S in the text=a1*b1*c1+a2*b2*c2.

207: Determine, when the weight of at least one keyword category is greater than a preset threshold, a category of the text according to a keyword category that has a greatest weight.

When the weight of one keyword category is greater than the preset threshold, the category of the text may be directly determined according to this keyword category. For example, if the keyword category is the politics category, the category of the sensitive text is the politics category.

When the weight of at least one keyword category is greater than the preset threshold, the category of the text is determined according to a keyword category that has a greatest weight. For example, keyword categories are the politics category and violence category, and the weight of the violence category is greater than the weight of the politics category, category of the sensitive text is the violence category.

208: Determine a sensitive degree of the text by comparing the weight of the keyword category that has the greatest weight with the preset threshold.

When the sensitive degree of the text is determined by comparing the weight of the keyword category that has the greatest weight with the preset threshold, specifically, the following manner may be used:

when the weight of the keyword category is greater than the preset threshold by 0%-20%, the sensitive degree of the text may be determined as a one-star level; when the weight of the keyword category is greater than the preset threshold by 20%-40%, the sensitive degree of the text may be determined as a two-star level; when the weight of the keyword category is greater than the preset threshold by 40%-60%, the sensitive degree of the text may be determined as a three-star level; when the weight of the keyword category is greater than the preset threshold by 60%-80%, the sensitive degree of the text may be determined as a four-star level; and when the weight of the keyword category is greater than the preset threshold by 80%-100%, the sensitive degree of the text may be determined as a five-star level.

The foregoing merely provides one possible implementation manner of determining a sensitive degree of a text. An implementation manner of determining a sensitive degree of a text is not specifically limited in this embodiment.

209: Output the sensitive degree of the text.

In order to provide reference data for a subsequent reviewer of the sensitive text, the determined sensitive degree may be output, so that it is convenient for the reviewer of the sensitive text to determine whether to publish the text. The sensitive degree of the text may be output by using a specific display interface, which is not specifically limited in this embodiment.

It should be noted that, when the method provided by this embodiment is executed, the foregoing steps 207 to 209 may also not be executed, in other words, step 210 is executed directly without determining the category corresponding to the sensitive text and the sensitive degree of the sensitive text. Step 210 specifically includes the following content: Determine that the text is a sensitive text when the weight of at least one keyword category is greater than a preset threshold.

A value of the preset threshold may be 10, 20, or the like. In this embodiment, the value of the preset threshold is not specifically limited and may be set according to specific situations.

When a text is detected, a situation in which weights of multiple keyword categories are greater than the preset threshold may occur. With regard to this situation, no matter which keyword categories having the weights greater than the preset threshold, the text is directly determined as a sensitive text. In other words, the text may involve content which is not suitable to be published, such as political views, pornography, or severe violence. The text needs to be isolated, and manually reviewed in a subsequent process to determine whether to publish the text.

Besides, after the foregoing steps 201 to 206 are executed and step 210 is executed directly, if the currently detected text is a sensitive text, a sensitive degree of the sensitive text may also be determined and output, so as to make the sensitive degree of the sensitive text clear, and facilitate a subsequent decision of whether to publish the text.

According to the method provided by this embodiment, after a feature text string of a currently detected text is acquired, the feature text string is detected according to a finite-state machine established in advance, so as to obtain frequency of occurrence of each keyword in the feature text string; the feature text string is detected based on the finite-state machine established in advance, and therefore, in the detecting process, only the feature text string needs to be scanned throughout once, thereby improving detection efficiency, increasing a detection speed, and reducing a resource occupancy rate; and moreover, for each keyword category of multiple keyword categories, a weight of the keyword category in the text is calculated based on the frequency of occurrence of each keyword corresponding to the keyword category and a preset weight of each keyword, and it is determined, according to the weight of the keyword category, whether the currently detected text is a sensitive text. Because the preset weight of each keyword also needs to be used as a basis for determining a sensitive text, detection granularity and detection precision are improved, and a network reading environment can be purified. Besides, because the keyword category is set, the sensitive text may be differentiated effectively by determining, according to the keyword category, a category of the sensitive text. Moreover, based on the sensitive degree of the sensitive text, whether the sensitive text is suitable to be published can be reflected intuitively in an explicit manner, making it convenient for the reviewer to review the sensitive text.

Embodiment 3

Figure 6:
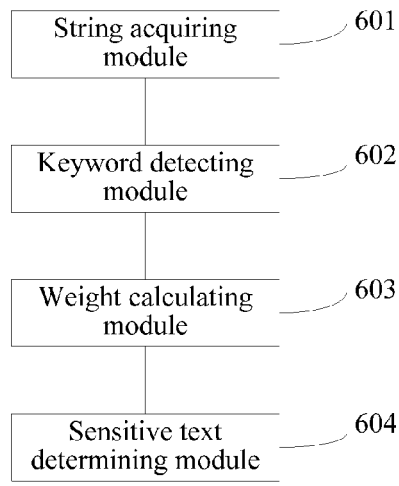
FIG. 6 is a schematic structural diagram of a sensitive text detecting apparatus according to Embodiment 3 of the present invention.

This embodiment of the present invention provides a sensitive text detecting apparatus, which is configured to execute the method provided by Embodiment 1 or Embodiment 2. Referring to FIG. 6, the apparatus includes a string acquiring module 601, a keyword detecting module 602, a weight calculating module 603, and a sensitive text determining module 604.

The string acquiring module 601 is configured to acquire a feature text string of a currently detected text. The keyword detecting module 602 is connected to the string acquiring module 601 and is configured to detect the feature text string according to a finite-state machine established in advance, so as to obtain frequency of occurrence of each keyword in the feature text string, the finite-state machine including multiple keywords. The weight calculating module 603 is connected to the keyword detecting module 602 and is configured to calculate, for each keyword category of multiple keyword categories, a weight of the keyword category in the text based on the frequency of occurrence of each keyword corresponding to the keyword category and a preset weight of each keyword. The sensitive text determining module 604 is connected to the weight calculating module 603 and is configured to determine that the text is a sensitive text when the weight of at least one keyword category is greater than a preset threshold.

Optionally, the apparatus further includes:

a configuring module, configured to configure a keyword list, the keyword list at least including multiple keywords, a keyword category of each keyword, and a preset weight of each keyword;

a common prefix determining module, configured to determine a common prefix of all keywords in the keyword list; and a finite-state machine establishing module, configured to establish a tree-like finite-state machine by using the common prefix as a root node, each branch of the tree-like finite-state machine at least including one keyword.

Optionally, the keyword detecting module is configured to detect the feature text string backward from the end of the feature text string based on the finite-state machine and by using a bad character shift technology.

Optionally, the keyword detecting module includes:

a determining unit, configured to determine a shortest string in the finite-state machine, and move the finite-state machine backward from the end of the feature text string until an end character of the shortest string is aligned with an end character of the feature text string; and a judging unit, configured to determine whether an initial character of a common prefix matches a first character of the feature text string aligned with the common prefix; determine, based on the finite-state machine and starting from a character aligned with the initial character of the common prefix, whether a keyword exists in the feature text string if the initial character of the common prefix matches the first character of the feature text string aligned with the common prefix; and increase the frequency of occurrence of the keyword by 1 and move the finite-state machine backward by a length corresponding to a longest string if the keyword exists; or determine whether a character matching the first character exists in the finite-state machine if the initial character of the common prefix does not match the first character of the feature text string aligned with the common prefix; move the finite-state machine backward if the character matching the first character exists, until the character matching the first character in the finite-state machine is aligned with the first character, and determine, based on the finite-state machine and starting from a character aligned with the initial character of the common prefix, whether a keyword exists in the feature text string; and increase the frequency of occurrence of the keyword by 1 and move the finite-state machine backward by a length corresponding to a longest string if the keyword exists; and repeat the foregoing process until the common prefix reaches the beginning of the feature text string.

Optionally, the apparatus further includes:

a position weight determining module, configured to determine a position weight of each keyword, which corresponds to the keyword category, in the text; and a weight calculating module, configured to calculate a weight of the keyword category in the text based on the frequency of occurrence of each keyword corresponding to the keyword category, the preset weight of each keyword, and the position weight of each keyword.

Optionally, the apparatus further includes:

a text category determining module, configured to determine, when the weight of at least one keyword category is greater than the preset threshold, a category of the text according to a keyword category that has a greatest weight;

a sensitive degree determining module, configured to determine a sensitive degree of the text by comparing the weight of the keyword category that has the greatest weight with the preset threshold; and a sensitive degree outputting module, configured to output the sensitive degree of the text.

In conclusion, after acquiring a feature text string of a currently detected text, the apparatus provided by this embodiment detects the feature text string according to a finite-state machine established in advance, so as to obtain frequency of occurrence of each keyword in the feature text string; the feature text string is detected based on the finite-state machine established in advance, and therefore, in the detecting process, the apparatus only needs to scan the feature text string throughout once, thereby improving detection efficiency, increasing a detection speed, and reducing a resource occupancy rate; and moreover, for each keyword category of multiple keyword categories, the apparatus calculates a weight of the keyword category in the text based on the frequency of occurrence of each keyword corresponding to the keyword category and a preset weight of each keyword, and determines, according to the weight of the keyword category, whether the currently detected text is a sensitive text. Because the preset weight of each keyword also needs to be used as a basis for determining a sensitive text, detection granularity and detection precision are improved, and a network reading environment can be purified.

Embodiment 4

Figure 7:
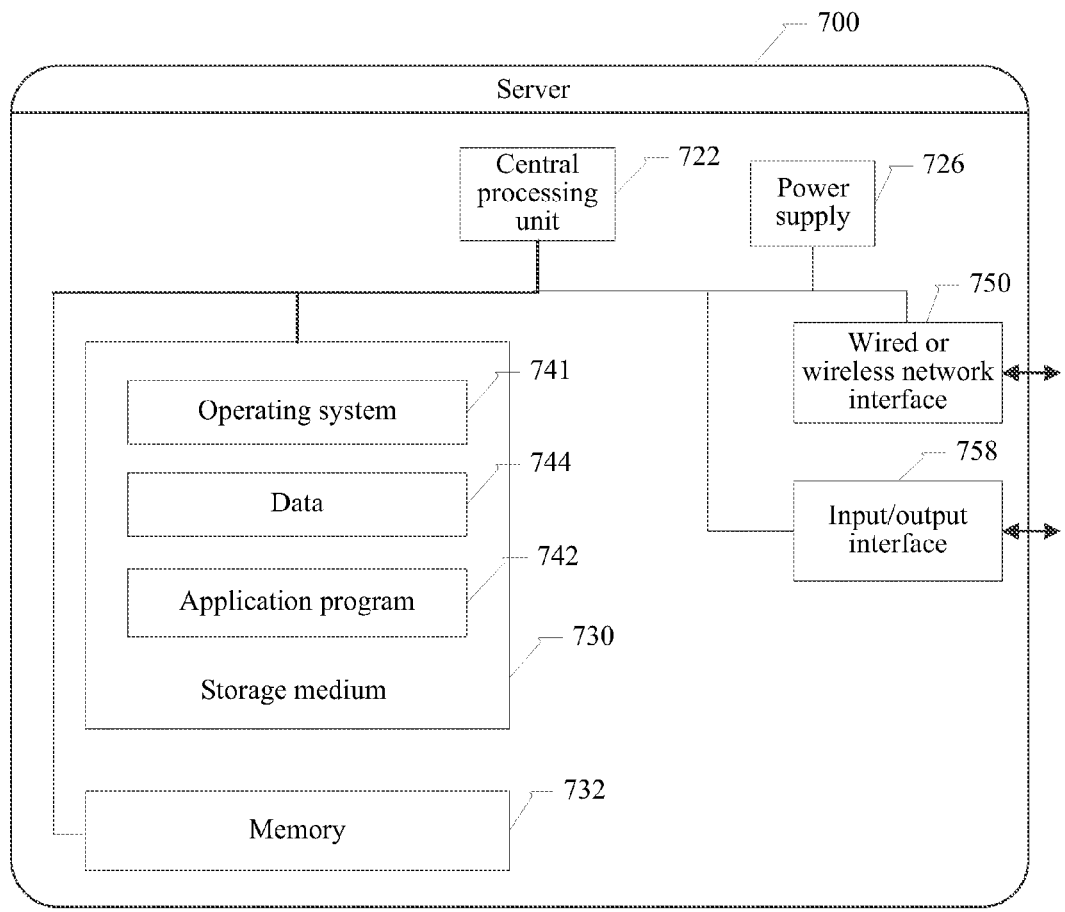
FIG. 7 is a schematic structural diagram of a server according to Embodiment 4 of the present invention.

This embodiment provides a server. The server may be configured to execute the sensitive text detecting method provided by the foregoing embodiments. Referring to FIG. 7, the server 700 may vary significantly according to different configurations or performance. The server 700 may include one or more central processing units (CPUs) 722 (for example, one or more processors), a memory 732, and one or more storage media 730 (for example, one or more massive storage devices) for storing an application program 742 or data 744. The memory 732 and the storage medium 730 may be used for temporary or permanent storage. A program stored in the storage medium 730 may include one or more modules (not shown in the figure). Each module may include a series of instruction operations on the server. Further, the CPU 722 may be configured to communicate with the storage medium 730, and execute, on the server 700, a series of instruction operations that are in the storage medium 730.

The server 700 may further include one or more power supplies 727, one or more wired or wireless network interfaces 750, one or more input/output interfaces 758, and/or one or more operating systems 741 such as Windows Server™, Mac OS X™, Unix™, Linux™, and FreeBSD™.

Specifically, in this embodiment, one or more programs configured to be executed by the one or more processors include an instruction for performing the following operations:

acquiring a feature text string of a currently detected text;

detecting the feature text string according to a finite-state machine established in advance, so as to obtain frequency of occurrence of each keyword in the feature text string, the finite-state machine including multiple keywords;

calculating, for each keyword category of multiple keyword categories, a weight of the keyword category in the text based on the frequency of occurrence of each keyword corresponding to the keyword category and a preset weight of each keyword; and determining that the text is a sensitive text when the weight of at least one keyword category is greater than a preset threshold.

Assuming that the foregoing is a first possible implementation manner, on the basis of the first possible implementation manner, in a second possible implementation manner, the memory of the server may further include an instruction for performing the following operations:

configuring a keyword list, the keyword list at least including multiple keywords, a keyword category of each keyword, and a preset weight of each keyword;

determining a common prefix of all keywords in the keyword list; and establishing a tree-like finite-state machine by using the common prefix as a root node, each branch of the tree-like finite-state machine at least including one keyword.

On the basis of the first possible implementation manner, in a third possible implementation manner, the memory of the server may further include an instruction for performing the following operations:

detecting the feature text string backward from the end of the feature text string based on the finite-state machine and by using a bad character shift technology.

On the basis of the third possible implementation manner, in a fourth possible implementation manner, the memory of the server may further include an instruction for performing the following operations:

step a: determining a shortest string in the finite-state machine, and moving the finite-state machine backward from the end of the feature text string until an end character of the shortest string is aligned with an end character of the feature text string;

step b: determining whether an initial character of a common prefix matches a first character of the feature text string aligned with the common prefix;

step c: determining, based on the finite-state machine and starting from a character aligned with the initial character of the common prefix, whether a keyword exists in the feature text string if the initial character of the common prefix matches the first character of the feature text string aligned with the common prefix; and increasing the frequency of occurrence of the keyword by 1 and moving the finite-state machine backward by a length corresponding to a longest string if the keyword exists; or step d: determining whether a character matching the first character exists in the finite-state machine if the initial character of the common prefix does not match the first character of the feature text string aligned with the common prefix; moving the finite-state machine backward if the character matching the first character exists, until the character matching the first character in the finite-state machine is aligned with the first character, and determining, based on the finite-state machine and starting from a character aligned with the initial character of the common prefix, whether a keyword exists in the feature text string; and increasing the frequency of occurrence of the keyword by 1 and moving the finite-state machine backward by a length corresponding to a longest string if the keyword exists; and step e: executing step b to step d repeatedly until the common prefix reaches the beginning of the feature text string.

On the basis of the first possible implementation manner, in a fifth possible implementation manner, the memory of the server may further include an instruction for performing the following operations:

determining a position weight of each keyword, which corresponds to the keyword category, in the text; where the calculating a weight of the keyword category in the text includes: calculating the weight of the keyword category in the text based on the frequency of occurrence of each keyword corresponding to the keyword category, the preset weight of each keyword, and the position weight of each keyword.

On the basis of the first possible implementation manner, in a sixth possible implementation manner, the memory of the server may further include an instruction for performing the following operations:

determining, when the weight of at least one keyword category is greater than the preset threshold, a category of the text according to a keyword category that has a greatest weight;

determining a sensitive degree of the text by comparing the weight of the keyword category that has the greatest weight with the preset threshold; and outputting the sensitive degree of the text.

After acquiring a feature text string of a currently detected text, the server provided by this embodiment detects the feature text string according to a finite-state machine established in advance, so as to obtain frequency of occurrence of each keyword in the feature text string; the feature text string is detected based on the finite-state machine established in advance, and therefore, in the detecting process, the server only needs to scan the feature text string throughout once, thereby improving detection efficiency, increasing a detection speed, and reducing a resource occupancy rate; and moreover, for each keyword category of multiple keyword categories, the server calculates a weight of the keyword category in the text based on the frequency of occurrence of each keyword corresponding to the keyword category and a preset weight of each keyword, and determines, according to the weight of the keyword category, whether the currently detected text is a sensitive text. Because the preset weight of each keyword also needs to be used as a basis for determining a sensitive text, detection granularity and detection precision are improved, and a network reading environment can be purified.

Embodiment 5

This embodiment of the present invention provides a computer readable storage medium. The computer readable storage medium may be a computer readable storage medium included in the memory in the foregoing embodiment and may also be an independent computer readable storage medium that is not assembled in a server. The computer readable storage medium stores one or more programs. The one or more programs are used by one or more processors to execute a sensitive text detecting method. The method includes:

acquiring a feature text string of a currently detected text;

detecting the feature text string according to a finite-state machine established in advance, so as to obtain frequency of occurrence of each keyword in the feature text string, the finite-state machine including multiple keywords;

calculating, for each keyword category of multiple keyword categories, a weight of the keyword category in the text based on the frequency of occurrence of each keyword corresponding to the keyword category and a preset weight of each keyword; and determining that the text is a sensitive text when the weight of at least one keyword category is greater than a preset threshold.

Assuming that the foregoing is a first possible implementation manner, on the basis of the first possible implementation manner, in a second implementation manner, before the detecting the feature text string according to a finite-state machine established in advance, the method further includes:

configuring a keyword list, the keyword list at least including multiple keywords, a keyword category of each keyword, and a preset weight of each keyword;

determining a common prefix of all keywords in the keyword list; and establishing a tree-like finite-state machine by using the common prefix as a root node, each branch of the tree-like finite-state machine at least including one keyword.

On the basis of the first possible implementation manner, in a third possible implementation manner, the detecting the feature text string according to a finite-state machine established in advance includes:

detecting the feature text string backward from the end of the feature text string based on the finite-state machine and by using a bad character shift technology.

On the basis of the third possible implementation manner, in a fourth possible implementation manner, the detecting the feature text string backward based on the finite-state machine and by using a bad character shift technology includes:

step a: determining a shortest string in the finite-state machine, and moving the finite-state machine backward from the end of the feature text string until an end character of the shortest string is aligned with an end character of the feature text string;

step b: determining whether an initial character of a common prefix matches a first character of the feature text string aligned with the common prefix;

step c: determining, based on the finite-state machine and starting from a character aligned with the initial character of the common prefix, whether a keyword exists in the feature text string if the initial character of the common prefix matches the first character of the feature text string aligned with the common prefix; and increasing the frequency of occurrence of the keyword by 1 and moving the finite-state machine backward by a length corresponding to a longest string if the keyword exists; or step d: determining whether a character matching the first character exists in the finite-state machine if the initial character of the common prefix does not match the first character of the feature text string aligned with the common prefix; moving the finite-state machine backward if the character matching the first character exists, until the character matching the first character in the finite-state machine is aligned with the first character, and determining, based on the finite-state machine and starting from a character aligned with the initial character of the common prefix, whether a keyword exists in the feature text string; and increasing the frequency of occurrence of the keyword by 1 and moving the finite-state machine backward by a length corresponding to a longest string if the keyword exists; and step e: executing step b to step d repeatedly until the common prefix reaches the beginning of the feature text string.

On the basis of the first possible implementation manner, in a fifth possible implementation manner, before the calculating a weight of the keyword category in the text, the method further includes:

determining a position weight of each keyword, which corresponds to the keyword category, in the text; where the calculating a weight of the keyword category in the text includes:

calculating the weight of the keyword category in the text based on the frequency of occurrence of each keyword corresponding to the keyword category, the preset weight of each keyword, and the position weight of each keyword.

On the basis of the first possible implementation manner, in a sixth possible implementation manner, after the determining that the text is a sensitive text, the method further includes:

determining, when the weight of at least one keyword category is greater than the preset threshold, a category of the text according to a keyword category that has a greatest weight;

determining a sensitive degree of the text by comparing the weight of the keyword category that has the greatest weight with the preset threshold; and outputting the sensitive degree of the text.

After acquiring a feature text string of a currently detected, the computer readable storage medium provided by this embodiment detects the feature text string according to a finite-state machine established in advance, so as to obtain frequency of occurrence of each keyword in the feature text string; the feature text string is detected based on the finite-state machine established in advance, and therefore, in the detecting process, the computer readable storage medium only needs to scan the feature text string throughout once, thereby improving detection efficiency, increasing a detection speed, and reducing a resource occupancy rate; and moreover, for each keyword category of multiple keyword categories, the computer readable storage medium calculates a weight of the keyword category in the text based on the frequency of occurrence of each keyword corresponding to the keyword category and a preset weight of each keyword, and determines, according to the weight of the keyword category, whether the currently detected text is a sensitive text. Because the preset weight of each keyword also needs to be used as a basis for determining a sensitive text, detection granularity and detection precision are improved, and a network reading environment can be purified.

It should be noted that, when the sensitive text detecting apparatus provided by the foregoing embodiment detects a sensitive text, the foregoing division of functional modules is merely used as an example for description. In an actual application, the foregoing functions may be implemented by different functional modules as needed, that is, an internal structure of a device is divided into different functional modules to implement all or some of functions described above. Besides, the sensitive text detecting apparatus and the sensitive text detecting method provided by the foregoing embodiments belong to a same conception. For details about a specific implementation process of the sensitive text detecting apparatus, reference may be made to the method embodiments, which are not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

The invention claimed is:

1. A sensitive text detecting method comprising:
by a server system comprising one or more processors,
acquiring, from a user terminal triggered in response to detecting updated text, a feature text string of a currently detected text;
detecting the feature text string according to a finite-state machine indicating transitions between states based on information determined by the server system, the transitions enabling the server system to scan the feature text string once, and the information causing the server system to determine frequency of occurrence of each keyword in the feature text string, the finite-state machine being associated with multiple keywords;
calculating, for each keyword category of multiple keyword categories, a weight of the keyword category in the text based on the frequency of occurrence of each keyword corresponding to the keyword category and a preset weight of each keyword; and
determining that the text is a sensitive text when the weight of at least one keyword category is greater than a preset threshold;
wherein the method further comprises:
after the determining that the text is a sensitive text, determining, when the weight of at least one keyword category is greater than the preset threshold, a category of the text according to a keyword category that has a greatest weight;
determining a sensitive degree of the text by comparing the weight of the keyword category that has the greatest weight with the preset threshold; and
outputting, to a reviewer via a display, the sensitive degree of the text.

2. The method according to claim 1, before the detecting the feature text string according to a finite-state machine, the method further comprising:
configuring a keyword list, the keyword list at least comprising multiple keywords, a keyword category of each keyword, and a preset weight of each keyword;
determining a common prefix of all keywords in the keyword list; and
establishing a tree-like finite-state machine by using the common prefix as a root node, each branch of the tree-like finite-state machine at least comprising one keyword.

3. The method according to claim 1, wherein the detecting the feature text string according to a finite-state machine comprises:
detecting the feature text string backward from the end of the feature text string based on the finite-state machine and by using a bad character shift technology.

4. The method according to claim 3, wherein the detecting the feature text string backward based on the finite-state machine and by using a bad character shift technology comprises:
step a: determining a shortest string in the finite-state machine, and moving the finite-state machine backward from the end of the feature text string until an end character of the shortest string is aligned with an end character of the feature text string;
step b: determining whether an initial character of a common prefix matches a first character of the feature text string aligned with the common prefix;
step c: determining, based on the finite-state machine and starting from a character aligned with the initial character of the common prefix, whether a keyword exists in the feature text string if the initial character of the common prefix matches the first character of the feature text string aligned with the common prefix; and
increasing the frequency of occurrence of the keyword by 1 and moving the finite-state machine backward by a length corresponding to a longest string if the keyword exists; or
step d: determining whether a character matching the first character exists in the finite-state machine if the initial character of the common prefix does not match the first character of the feature text string aligned with the common prefix; moving the finite-state machine backward if the character matching the first character exists, until the character matching the first character in the finite-state machine is aligned with the first character, and determining, based on the finite-state machine and starting from a character aligned with the initial character of the common prefix, whether a keyword exists in the feature text string; and increasing the frequency of occurrence of the keyword by 1 and moving the finite-state machine backward by a length corresponding to a longest string if the keyword exists; and
step e: executing step b to step d repeatedly until the common prefix reaches the beginning of the feature text string.

5. The method according to claim 1, before the calculating a weight of the keyword category in the text, the method further comprising:
determining a position weight of each keyword, which corresponds to the keyword category, in the text; wherein
the calculating a weight of the keyword category in the text comprises:
calculating the weight of the keyword category in the text based on the frequency of occurrence of each keyword corresponding to the keyword category, the preset weight of each keyword, and the position weight of each keyword.

6. A server system comprising a memory and a processor communicating with the memory, the memory storing instructions that when executed by the processor cause the processor to:
acquire, from a user terminal, a feature text string of a currently detected text;
detect the feature text string according to a finite-state machine indicating transitions between states based on information determined by the server system, the information causing the server system to obtain frequency of occurrence of each keyword in the feature text string, wherein the finite-state machine is associated with multiple keywords;
calculate, for each keyword category of multiple keyword categories, a weight of the keyword category in the text based on the frequency of occurrence of each keyword corresponding to the keyword category and a preset weight of each keyword; and
determine that the text is a sensitive text when the weight of at least one keyword category is greater than a preset threshold;
wherein the instructions further cause the processor to:
output, to a reviewer via a display, the sensitive text and information indicating a sensitive degree of the text, thereby enabling a publishing determination.

7. The server system according to claim 6, wherein the instructions further cause the processor to:

configure a keyword list, wherein the keyword list at least comprises multiple keywords, a keyword category of each keyword, and a preset weight of each keyword;

determine a common prefix of all keywords in the keyword list; and establish a tree-like finite-state machine by using the common prefix as a root node, wherein each branch of the tree-like finite-state machine at least comprises one keyword.

8. The server system according to claim 6, wherein the instructions further cause the processor to:

detect the feature text string backward from the end of the feature text string based on the finite-state machine and by using a bad character shift technology.

9. The server system according to claim 8, wherein the instructions further cause the processor to:

determine a shortest string in the finite-state machine, and move the finite-state machine backward from the end of the feature text string until an end character of the shortest string is aligned with an end character of the feature text string;

determine whether an initial character of a common prefix matches a first character of the feature text string aligned with the common prefix; determine, based on the finite-state machine and starting from a character aligned with the initial character of the common prefix, whether a keyword exists in the feature text string if the initial character of the common prefix matches the first character of the feature text string aligned with the common prefix; and increase the frequency of occurrence of the keyword by 1 and move the finite-state machine backward by a length corresponding to a longest string if the keyword exists; or determine whether a character matching the first character exists in the finite-state machine if the initial character of the common prefix does not match the first character of the feature text string aligned with the common prefix;

move the finite-state machine backward if the character matching the first character exists, until the character matching the first character in the finite-state machine is aligned with the first character, and determine, based on the finite-state machine and starting from a character aligned with the initial character of the common prefix, whether a keyword exists in the feature text string; and increase the frequency of occurrence of the keyword by 1 and move the finite-state machine backward by a length corresponding to a longest string if the keyword exists; and repeat the foregoing process until the common prefix reaches the beginning of the feature text string.

10. The server system according to claim 6, wherein the instructions further cause the processor to:

determine a position weight of each keyword, which corresponds to the keyword category, in the text; and calculate the weight of the keyword category in the text based on the frequency of occurrence of each keyword corresponding to the keyword category, the preset weight of each keyword, and the position weight of each keyword.

11. The server system according to claim 6, wherein the instructions further cause the processor to:

determine, when the weight of at least one keyword category is greater than the preset threshold, a category of the text according to a keyword category that has a greatest weight;

determine a sensitive degree of the text by comparing the weight of the keyword category that has the greatest weight with the preset threshold; and output, to a reviewer via a display, the sensitive degree of the text.

12. The server system of claim 6, wherein the server system scans the feature text string once, thereby improving one or more of: efficiency, detection speed.

* * * * *